United States Patent [19]

Lehman et al.

[11] 4,272,188

[45] Jun. 9, 1981

[54] EXPOSURE COMPENSATION CIRCUIT FOR A COPIER

[75] Inventors: Richard F. Lehman, Fairport; Stephen C. Corona, Rochester, both of N.Y.

[73] Assignee: Xerox Corporation, Stamford, Conn.

[21] Appl. No.: 77,237

[22] Filed: Sep. 19, 1979

[51] Int. Cl.³ .............................................. G03B 27/72

[52] U.S. Cl. ...................................... 355/68; 315/151; 315/241 R

[58] Field of Search .................................... 355/67-71; 354/33, 34; 315/151, 241 P, 241 R

[56] References Cited

U.S. PATENT DOCUMENTS

| | | | |
|---|---|---|---|
| 3,519,879 | 7/1970 | Ogawa | 315/151 |
| 3,697,177 | 10/1972 | Booth | 355/67 |
| 3,737,721 | 6/1973 | Ogawa | 354/33 X |
| 3,774,072 | 11/1973 | Ogawa | 315/151 |
| 3,947,117 | 3/1976 | Basu et al. | 355/68 |
| 3,985,440 | 10/1976 | Dennhardt et al. | 355/68 |
| 3,998,547 | 12/1976 | Schröter et al. | 355/68 |
| 4,017,180 | 4/1977 | Yen et al. | 355/68 |
| 4,093,376 | 6/1978 | Rabindran et al. | 355/68 |
| 4,101,812 | 7/1978 | Müller et al. | 354/33 X |

*Primary Examiner*—Joseph W. Hartary
*Assistant Examiner*—W. J. Brady

[57] ABSTRACT

An automatic exposure control system for a full-frame copier controls the illumination of a flash lamp in response to the reflectivity of a document to be reproduced. A photodetector senses exposure at the wall of a light housing and after sufficient exposure is reached, the light source is turned off (quenched). A compensation circuit anticipates the total energy emitted after quench (representing an over exposure potential) and terminates the light source energizing pulse so as to produce only desired exposure without over-exposure error.

1 Claim, 6 Drawing Figures

EXPOSURE COMPENSATION CIRCUIT FOR A COPIER

BACKGROUND AND PRIOR ART STATEMENT

The present invention relates to an automatic exposure control system for copier systems which utilize flash exposure of a document. More particularly, it relates to a control and compensation circuit which senses the amount of radiant energy reflected from the object onto walls of an optical housing while exposure of a photosensitive material is occurring and terminates the flash after sufficient exposure level is reached.

When an object is reproduced, either photographically or electrophotographically, by flash exposure of a light sensitive material, the density of the object (dark and light highlights) must be determined in some manner so that compensation can be made to maintain exposure uniformity. Prior art efforts to control exposure automatically are reflected in numerous publications. In photographic applications, an automatic exposure control for an electronic flash unit typically includes a light meter and electronic circuitry which detects the instantaneous amount of light reflected from the scene to be photographed onto the light sensitive element of the light meter. The light meter contains circuitry which integrates the signal derived from the light detecting element. When the integrated signals enter a predetermined level corresponding to required film exposure the flash is extinguished. Representative of various such arrangements are U.S. Pat. No. Re. 28,783; U.S. Pat. Nos. 3,350,604; 3,756,132; 3,776,112; 3,783,336 and 4,132,925.

In addition, various exposure control circuits are known in the photographic art which vary reference voltage with respect to time. The most relevant of these are disclosed in U.S. Pat. Nos. 3,737,721; 3,774,072; 3,985,440 and 4,101,812.

These photographic systems operate over relatively large dynamic ranges (compared to copiers) and the exposure control circuits are typically designed to tolerate errors upwards of 25% (¼ f/stop). An exposure control system, in order to obtain uniform exposure of a photoreceptor, must be considerably more accurate; in the order of ±6% error, or better. Some representative automatic exposure control systems in a copying environment are disclosed in U.S. Pat. Nos. 3,985,440; 3,998,547; 4,017,180; 4,093,376 and 3,947,117. While these control systems reduce exposure errors considerably, they either require complex circuitry to implement or do not reduce exposure errors to the small tolerances required to produce increasingly upgraded copy quality.

SUMMARY

The invention of the present application is directed to an automatic exposure circuit for a full frame optical system contained within a light housing.

The circuit is designed to continually monitor and compute both actual and anticipated illumination levels required for the document being reproduced and to generate a quench signal which terminates the flash output of the lamp at a point in time where the two combined illumination levels equal a predetermined reference level.

DRAWINGS

FIG. 1 is a block diagram of the present invention in a copier flash illumination environment.

FIGS. 2*a* and 2*b* are plots of light output energy as a function of time and at various quench points.

DESCRIPTION

Figure 1:
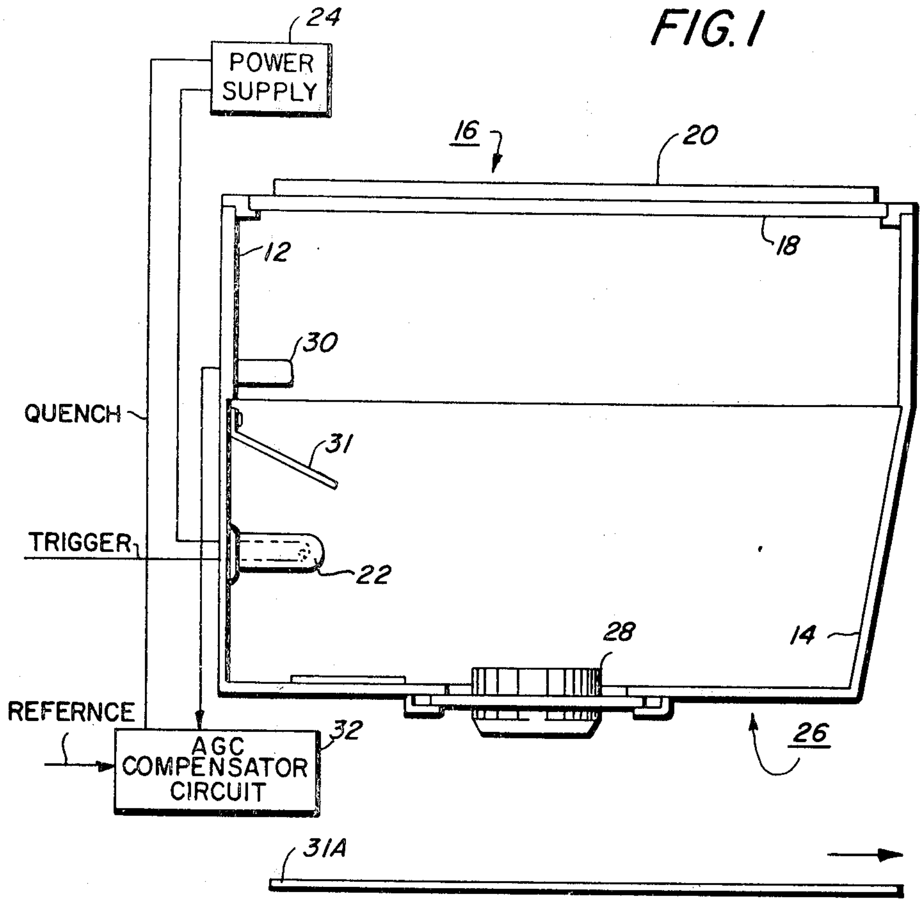

Referring to FIG. 1, a completely enclosed housing 10, shown in cross-section, is generally rectangular in shape and has a first pair of side walls (not shown) and a second pair of side walls 12, 14. Upper wall 16 accommodates a glass platen 18 supporting a document 20 to be copied. Mounted in the lower half of side wall 12 is flash lamp 22. Energy to the lamp is supplied by conventional power supply 24. The lower or bottom wall 26 accommodates a circular lens 28. Photodetector 30 is located in the upper part of side wall 12 masked from the lamp by blocker 31 and is adapted to sense light reflected from opposing side wall 14. The interior walls of the housing preferably have diffusely reflecting surfaces resulting from coating the walls with a high reflectivity material. The housing, therefore, has the characteristics of an integrating cavity of the type defined in co-pending application U.S. Ser. No.; 15558 the contents of which are hereby incorporated by reference. Upon initiation of a print command, a trigger pulse is applied to lamp 22, and energy from power supply 24 is applied to the lamp causing it to flash.

An image of document 20 is projected through lens 28 selectively discharging portions of a photoconductive sheet 31A moving in the indicated direction and forming a latent image of the document thereon. Since, in an integrating cavity, all walls have equal brightness, following the flash interval, photodetector 30 is actually sensing the brightness of the document. Further, the sensed light is proportional to the light onto sheet falling 31A (the exposure level) except for insignificant variations introduced by dirt or dust on the lens surface. Photodetector 30 thus produces a continuous output signal which varies in accordance with impinging light reflected from wall 14 and thus, with document exposure. The photodetector then sends the output signal into AGC compensation circuit 32. This circuit produces a time integral output signal of the intensity of illumination sensed by the photodetector, corrected for an overexposure error inherent in all flash lamp quench systems and to be described in further detail below. When this corrected time integral signal reaches a predetermined reference voltage, a quench signal is generated and sent to circuit 32 turning lamp 22 off.

The exposure level at the image plane is determined by the duration of the flash produced by lamp 22. The duration, in turn, is dependent upon the application of the quench signal derived from circuit 32. It is important for an understanding of the present invention to appreciate that the total amount of energy generated by the lamp during a single flash is composed of two separate components. The first component is the amount of energy generated from the time the lamp is triggered to the time the quench signal is received. The second component consists of a smaller amount of energy emitted by the lamp after quench is initiated. This additional energy is due to time delays in the electronics and thermal energy storage within the lamp itself. This additional energy is not constant but is rather a function of the electrical circuit and the physical state of the lamp at the time quench is initiated.

Figure 2A:
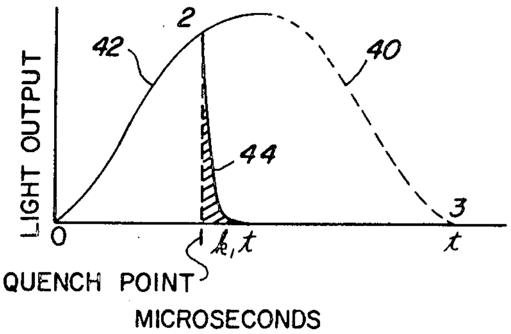
Figure 2B:
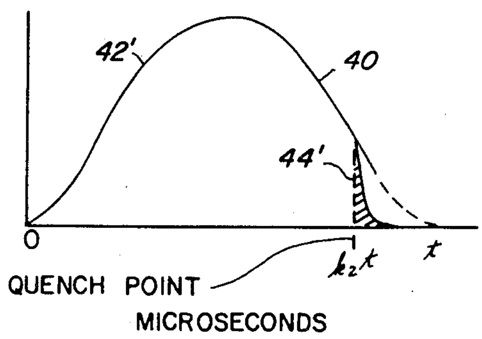

FIG. 2 illustrates this energy distribution. FIG. 2*a* shows a plot 40 of time vs. light output for a flash having an unquenched portion from point 0 (trigger) to point 3 of tμsec. It is assumed that a quench signal is received after k, tμsec. at point 2. The unshaded area 42 represents the first component Ebq (energy before quench point). Shaded area 44 represents the second component Eaq, the light energy which continued to be emitted by the lamp after the quench point. This additional energy, Eaq represents a source of overexposure error, the exact extent of which is dependent upon the point on plot 40 at which the quench occurs. For example, in FIG. 2*b* for the same plot 40, the quench point is at point 4, $k_2$ tμsec. after trigger. In this case, area 44' (Eaq) is quite small compared to area 44 in FIG. 2*a*. Also, the area 42 energy ($E_{bq}$) in FIG. 2*a* is smaller than that of area 42' in FIG. 2*b*. Both of these factors in the examples chosen, increase the percentage error in the exposure represented in the FIG. 2*a* plot compared with the FIG. 2*b* plot. The above energy component relationships can be simply expressed as:

$$E_T = E_{bq} + E_{aq} \quad (1)$$

where $E_T$ = Total radiant energy $E_{bq}$ = Radiant energy before quench $E_{aq}$ = Radiant energy after quench From FIGS. 2*a*, 2*b*, it is also readily observable that the relative shape of the Eaq portion of the light pulse does not change as a function of where on the total light pulse it occurs (although the height, i.e., point 2 or point 4, will change). As a result, the statement can be made that the integrated energy after quench is proportional to the instantaneous power (height of the light pulse). This instantaneous power is reflected by the instantaneous value of photodetector 20 output.

By utilizing the above insights, it is possible to anticipate the after quench energy by monitoring the instantaneous value of the photodetector signal and modifying it by a proportionality constant derived from the parameters of the particular flash circuitry employed. An algorithm for accomplishing this is derived by describing equation 1 in terms of photodetector signal (current).

Thus, $$\int_0^t Idt = \int_0^{t_q} Idt + \int_{t_q}^t Idt \text{ or} \quad (2)$$

$$\int_0^t Idt = \int_0^{t_q} Idt + (I(t)K) \quad (3)$$

where t = total flash time $t_q$ = time at quench point

K = proportionality constant based on circuit parameters

I = photodetector current

Figure 3:
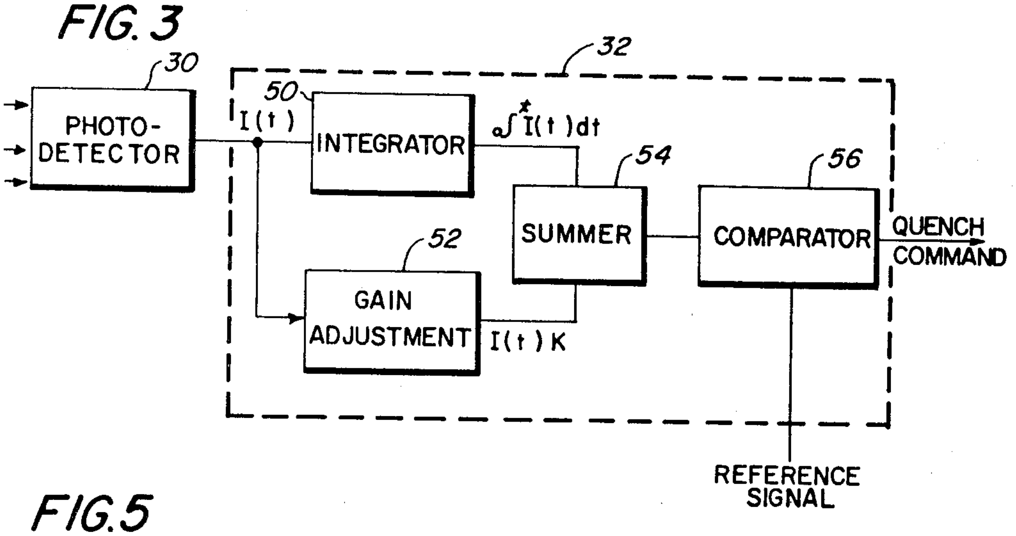
FIG. 3 is a block diagram of an automatic compensation exposure circuit according to the principles of the invention.
Figure 4:
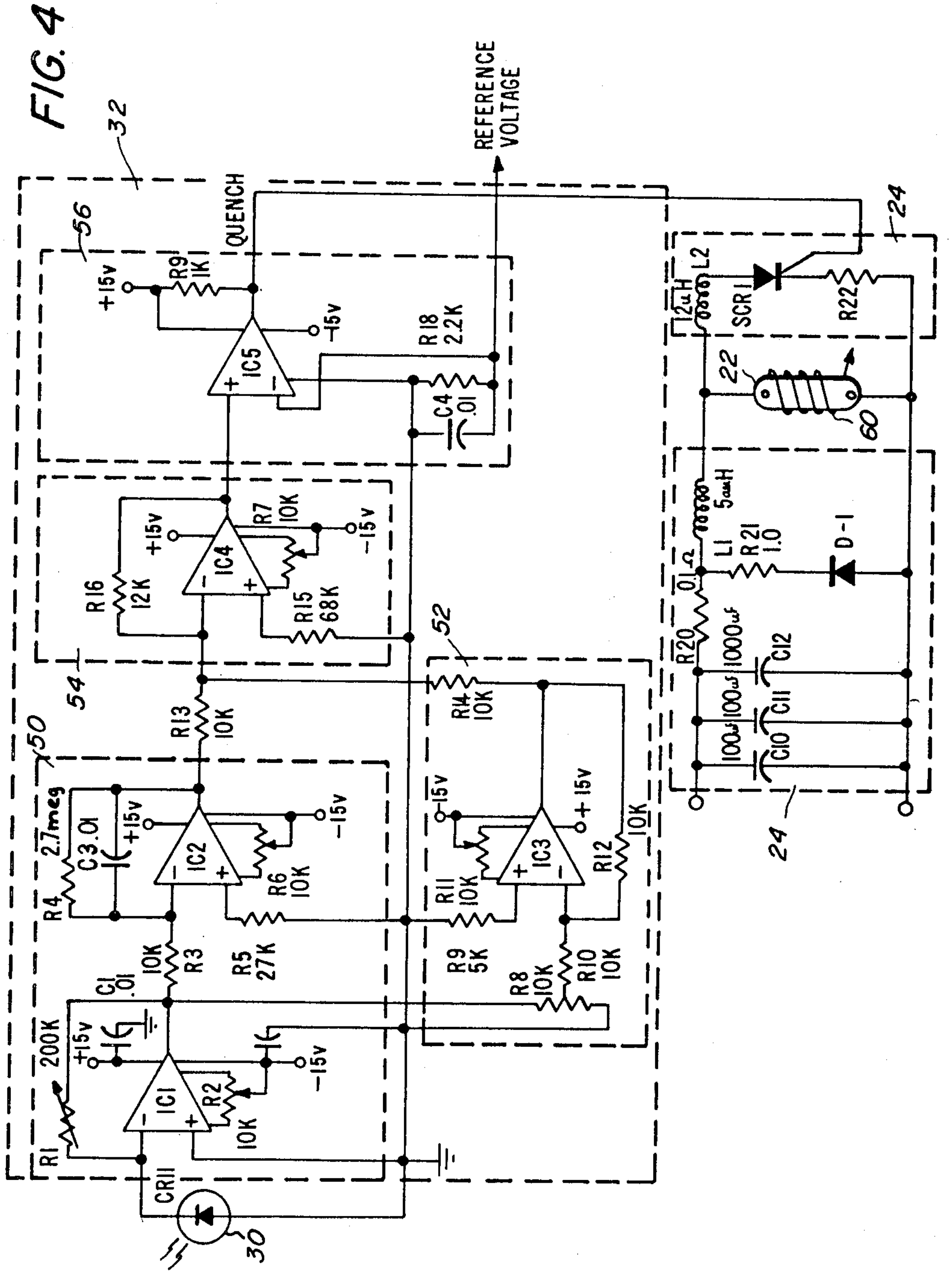
FIG. 4 is an electrical schematic of the circuitry of FIG. 3 and relevant portions of FIG. 1.

The conditions shown in equation 3 are implemented in circuit 32 shown in functional block form in FIG. 3 and in a specific embodiment in FIG. 4.

Referring to FIG. 3, circuit 32 is shown to consist of a number of functional components 50, 52, 54, 56. Photodetector 30 generates an output signal (t) which has a magnitude directly related to the intensity of the impinging light. The signal is integrated by integrator 50 to produce a signal $\int_0^t Itdt$ proportional to the accumulated output power of the lamp. The photodetector signal I(t) is also applied to gain adjustment circuit 52 where according to the principles of the invention, a signal I(t)K is generated, this signal being proportional to the energy after quench Eaq (shaded areas of FIG. 2). This signal is then added to the output of integrator 50 in summer 54. The output of summer 54 is thus a combined signal $\int_0^t I(t)dt + (I(t)K)$ which represents a total and hence accurate representation of both energy components previously described. This combined signal is compared in comparator 56 to the reference signal representing the desired exposure level. When the two signals become equal, the lamp quench signal is generated.

Referring now to FIG. 4, a specific embodiment of the circuits shown in FIGS. 1 and 3 is presented. Power supply 24 is connected across the terminals of lamp 22. An instantaneous triggering voltage applied to firing electrode 60 ionizes the gas in the tube lowering its resistance and allowing the energy stored in capacitors C10, C11, C12 to be discharged through lamp 22 in the form of a flash of light. Resistor R21 and clamping diode D1 in parallel with the energy storage connectors prevent lamp polarity reversal. Photodiode 30 provides an output current proportional to the intensity of the light impinging thereon. This signal is connected to operational amplifier IC1 contained within integrating circuit 50. Operational amplifier IC1 provides a current-to-voltage conversion of the photodetector signal and its output is proportional to the irradiance impinging on the photodetector and the gain of the circuit (controlled by potentiometer R1). The output of amplifier IC1 is connected to the input of operational amplifier IC2 in integrator 50 and across bias resistor arrangement R8, R10 to the input of operational amplifier IC3 in inverter and gain adjustment circuit 52. Amplifier IC2 integrates and inverts the output of IC1. The output of IC2 is equal to (−1) times the integral output of IC1 times the gain of the integrator which is controlled by the values of R3, C3. Resistor R4 resets the integrator between flashes without the need for an active switch. Its value is selected to provide minimum integrating error. In circuit 52, resistors R8, R10 provide the gain attenuation to reflect the proportionality constant of power supply 24. The constant must also reflect the integration constant of integrator circuit 50 so that the output of integrator 50 and circuit 52 can be properly combined in summer 54. Operational amplifier IC3 inverts and attenuates the adjusted IC1 output. The outputs of IC2 and IC3 are added together in operational amplifier IC4 in summer 54. The combined signal is inverted and applied to operational amplifier IC5 in comparator 56 where it is compared with the predetermined reference signal representing the desired exposure level.

When the input to IC5 reaches the reference level, a quench signal is generated making the gate of SCR1 positive with respect to the cathode and causing the SCR to conduct. This action effectively shorts the power supply output and effectively terminates (quenches) the discharge across the lamp. Resistor R22 and inductors L2, L1 limit the peak quench current through SCR1.

To summarize the operation of the circuitry shown in FIG. 4, the irradiance level of the lamp flash, as reflected from a document being copied, is continuously monitored while the additional energy that would result if the lamp was quenched at any particular instant is anticipated. When the accumulated integrated energy plus the anticipated additional energy reach a preset value referenced to a required exposure level, a signal is generated which quenches the lamp.

Figure 5:
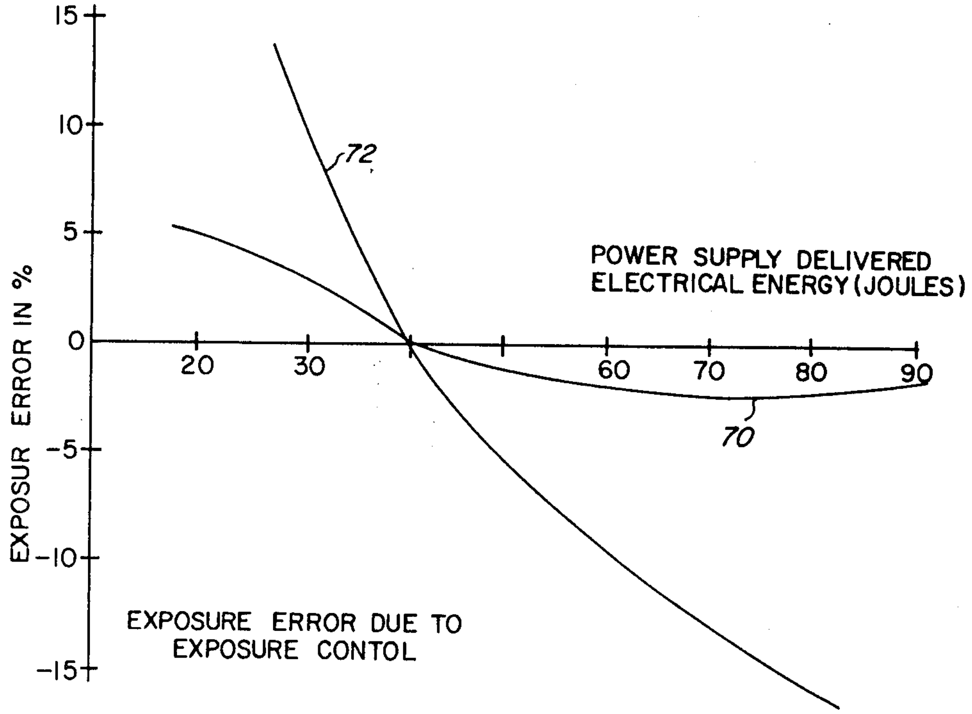
FIG. 5 is a graph plotting percentage of exposure error at various lamp output energies for compensated systems.

FIG. 5 is a graph of measured exposure error across the range of energy supplied by the power supply shown in FIG. 4 to the lamp. Curve 70 is a plot of the exposure error with the gain adjustment circuit of FIG. 4 while curve 72 is a plot of the error without compensation. As is apparent, the compensated error plot resulted in an exposure error of ±6% as compared to the uncompensated circuit range of ±15%.

Besides the decrease in exposure errors, other advantages are inherent when utilizing the compensation circuit of the invention. Since the quench time of the lamp will be anticipated and is, in effect, a known quantity for the particular system used, the actual time to completely quench the lamp is no longer critical. In other words, some relaxation of response time for critical circuit components is possible allowing use of less expensive elements, e.g. use of electrolytic capacitors and derated quench SCR.

Additional embodiments of the invention are possible consistent with the above objectives. For example, more than one flash lamp may be used in illuminate the document, each powered from its own, or a common, power supply.

What is claimed is:

1. A flash illumination and document exposure system for a copying machine comprising:

a completely enclosed light housing having a first surface adapted to accommodate a document platen and a second surface to accommodate a lens for focusing a document image onto an image plane;

said housing having side walls joined to said first and second surfaces; said side walls having diffusely reflecting interior surface whereby said light housing functions as an integrating cavity;

at least one flash lamp mounted within said housing for illuminating said document;

a triggering circuit connected to said lamp for initiating flash discharge;

a power supply for providing a discharge pulse to said lamp whereby in conjunction with said triggering circuit, said flash lamp produces a light flash;

a photosensor mounted within said housing to detect illumination at a wall of said housing, and to generate an output signal which varies in accordance with impinging light;

a quench circuit connected to said lamp which, when upon receipt of a quench command signal, extinguishes said light flash;

circuit means for generating said quench command signal, said circuit means including;

integrating means responsive to said photosensor signal to continuously generate a first output signal proportional to the total amount of light impinging on said photosensor;

compensation means responsive to said photosensor signal to generate a second output signal representative of the light which would continue to impinge on said photosensor after said quench signal is applied to said lamp;

said compensation means including a resistive element which attenuates the gain of the signal from said integrating means to reflect the proportionally constant of said power supply and the integration constant of said integrating means, and an operational amplifier connected to said resistive element which inverts and further attenuates the signal;

summing means for combining said first and second signals into a third signal representing the total pre and post quench energy expended by said lamp; and comparator means for comparing said third signal against a predetermined reference signal representative of the desired exposure level, said comparator means generating said quench signal when said third signal equals said reference signal.

* * * * *